(12) United States Patent
Snyder et al.

(10) Patent No.: US 6,195,474 B1
(45) Date of Patent: Feb. 27, 2001

(54) PATHOLOGY DEPENDENT VIEWING OF PROCESSED DENTAL RADIOGRAPHIC FILM HAVING AUTHENTICATION DATA

(75) Inventors: Patricia D. Snyder, Pittsford; Charles A. Hasso, Webster; Louis P. Masi, Penfield, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/085,508

(22) Filed: May 27, 1998

Related U.S. Application Data

(60) Provisional application No. 60/063,416, filed on Oct. 28, 1997.

(51) Int. Cl.$^7$ ............................... G06K 7/00; G06K 9/62
(52) U.S. Cl. .................................. 382/312; 382/128
(58) Field of Search .................................. 382/128, 312, 382/318, 319, 254, 305, 302, 132, 282, 284, 298

(56) References Cited

U.S. PATENT DOCUMENTS

| | | | |
|---|---|---|---|
| 5,164,993 | 11/1992 | Capozzi et al. | 382/128 |
| 5,172,419 | 12/1992 | Manian | 382/128 |
| 5,283,736 | 2/1994 | Nagatsuka et al. | 364/413.13 |
| 5,345,513 | 9/1994 | Takeda et al. | 382/128 |
| 5,483,325 | * 1/1996 | Bodapati et al. | 255/230 |
| 5,633,511 | 5/1997 | Lee et al. | 250/587 |
| 5,740,267 | * 4/1998 | Echerer et al. | 382/132 |

FOREIGN PATENT DOCUMENTS 452570   12/1994   (EP) .

* cited by examiner

Primary Examiner—Jose L. Couso
Assistant Examiner—Duy M. Dang
(74) Attorney, Agent, or Firm—William F. Noval

(57) ABSTRACT

The present invention automatically and quickly digitizes small format films, such as dental radiographs, processes digital images, and provides a means for digital image authentication. The radiographs are scanned using a flat-bed scanner with a transparency adapter. A template is used during image capture to assist in proper exposure during the digitization step to minimize undesired flare. Exposure levels are adjusted to accommodate the wide variability that can be found in processed films. A user interface is provided that will automatically bound the region of the platen to be scanned so that image processing can be accommodated on an image by image basis. An image tonescaling algorithm is implemented to render the image for soft copy display on an electronic display or other output device.

6 Claims, 14 Drawing Sheets

PATHOLOGY DEPENDENT VIEWING OF PROCESSED DENTAL RADIOGRAPHIC FILM HAVING AUTHENTICATION DATA

CROSS REFERENCE TO RELATED APPLICATION

Reference is made to and priority claimed from U.S. Provisional Application Serial No. 60/063,416, filed Oct. 28, 1997, entitled PATHOLOGY DEPENDENT VIEWING OF PROCESSED DENTAL RADIOGRAPHIC FILM HAVING AUTHENTICATION DATA.

FIELD OF THE INVENTION

This invention relates in general to the field of digital data processing and acquisition for imaging systems using flat-bed scanners. A primary application of the invention relates to the automatic digitization of small format films, such as dental radiograph films, and to the processing of digital images.

BACKGROUND OF THE INVENTION

Film digitization can be a low-cost and practical alternative to digital radiographic approaches such as storage phosphor computed radiography (CR) or direct digital image capture (CCD). In the absence of digital image capture, hybrid imaging systems can provide an expedient and low cost solution for both dentists and insurance companies. Without the more significant capital investment required for direct digital devices, the dental practitioner can have the advantages that the digital modality can offer, such as imaging capability to practice management, larger format imagery, and electronic insurance claims. Insurance companies are also motivated to advance to the electronic domain in order to reduce the overhead associated with manual claims submission. An important feature for electronic claims containing images is to provide the capability of verifying the authenticity of the digital images.

Digital images can provide flexibility to the viewer that the film image cannot. Contrast/brightness levels can be changed so that the signal present in the image can be perceived more thoroughly. This capability can be applied to localized regions of the digital image to enhance certain desired regions of interest according to user preference. This can be especially useful when probing areas of a digitized dental film for small signals that may be present in certain anatomical regions, such as interproximal or periapical regions.

U.S. Pat. Nos. 5,164,993 and 5,633,511 generally disclose the construction of tone-scale look-up-tables.

An important step in any hybrid imaging system is the initial image capture, in this case the scanning process. Exposure conditions should be carefully controlled in order to capture the image more optimally so that further degradation of the image in subsequent steps can be minimized. In practice this means controlling unwanted exposure or flare and maintaining proper alignment of the scanned images with the optical configuration. There is much variability among dental radiographs. Both varying x-ray exposure and processing of the radiograph contribute to this. This means that the dental x-ray can range from a very light "under-exposed" image to a very dark in appearance "over-exposed" image. Where there is too much exposure on the platen for an under-exposed radiograph, for example, the captured image will not have enough gray value content. Another important consideration during image capture is the alignment of the radiograph on the platen in the correct horizontal and vertical directions to maintain consistency with the CCD array of the digitizing scanner. If the image is not aligned properly during scanning, image rotation may be required, which can alter the aspect ratio of the original image. To minimize the effects of unwanted flare and image rotation, it is desirable that a template be used that will surround a small film with a dark mask. Alternatively, images can be in a holder typical of the dental practitioner's record keeping.

There is much in the literature that provides approaches for rendering digitally captured imagery. What has not been found is image processing that is specific to dental radiographs or addressing the problem of image capture using a flat-bed scanner and transparency adapter where the initial image capture can be degradated by excessive flare, and that incorporates specific information about the nature of the dental radiograph into an image processing algorithm.

U.S. Pat. No. 5,345,513 discloses the method for enhancement is based on histogram analysis of the digitized x-ray film image so that each pixel represents a density value. In particular, this analysis is demonstrated on chest x-rays. The histogram has unique regional signatures, each corresponding to anatomical structures, such as heart or lung regions. The image is then processed dynamically by constructing a piecewise contrast curve specific to chest x-ray anatomy. This method relies on the characterization of the histogram to provide region specific information for rendering the image, but does not address the problem of digitizing film.

U.S. Pat. No. 5,283,736 addresses the need for medical diagnosis from a digitized radiographic image providing a means for signal dependent image processing by thresholding relevant image areas to determine key values for each desired image area. The image data from desired regions of interest are used to determine a preferred density range, or a tone scale map.

U.S. Pat. No. 5,172,419 provides a system to correct exposures of x-ray film thus bypassing the need for second exposure so that an image acquisition, storage and display device can be used to improve image density. This system includes a film densitometer for digitizing film, storage, image processing and film recorder. The digitizer produces a representation of the optical densities for each pixel. Reference data (LUT) is stored consisting of optical densities and corresponding exposure for radiographic films. Using the LUT corresponding to the desired film type, the digitized data is compared to the table to determine the exposure of the image and a correction value is calculating and used to modify the pixel data so that the transformed pixels can be mapped for hard copy output (film) yielding the enhanced x-ray image European Patent Application 90200969.5, entitled "Processing and Digitizing Apparatus for Medical Radiographic Film," provides the means for processing and digitizing exposed film, offering a way to automatically digitize conventionally produce radiographs so that patient information is associated with each image for archival purposes.

U.S. Pat. No. 5,483,325 describes an accessory frame that can be mounted on a photocopier or electronic flatbed scanner that facilitates location and removal of small opaque originals, such as business cards. This patent does not address the problem of flare in copying transparent originals.

Where the processing of radiographs is controlled, a sensitometric curve can be relied upon to adjust pixel values found in the corresponding digitized radiograph. This technique requires more precise knowledge of the exposure levels, film and sensitometry, usually found in larger medical facilities. In the dental community that this work addresses, the wide range in variability of film type used and in film processing would make this technique unfeasible for digitized dental films.

There is also a need to assure that the processed image outputted by the system has not been altered. Digital dental images can be fraudulently altered to show added procedures, such as added fillings, that would result in overbilling.

SUMMARY OF THE INVENTION

According to the present invention, there is provided a solution to the problems of the prior art.

According to a feature of the present invention, there is provided an image dependent hybrid imaging system for small format films, such as dental radiographs. The invention has two stages. The first is the scanning of the small format films, such as dental radiographs on a flat-bed scanner. The second is the processing of the digitized images for soft copy display. The first stage consists of image dependent capture. There are two components. First is the pre-scanning of the platen area using an image template or any such film holder. Subsequent to the pre-scan is the automatic determination of the image to be scanned by bounding only the image area(s) desired. In the dental radiograph application, a template containing apertures dimensioned for size 0, 1, 2, 3, or 4 dental films, for example, is placed on the platen and dental radiographs can be placed inside the template apertures. This is done to minimize unwanted flare during scanning. The image of the pre-scanned platen is presented to the user on a video display (e.g., CRT) and images are selected from the display to be digitized (further). If the exact dimensions and position of the template apertures are known, then the location of the closest open region from the user selection point defines the image area to be scanned. To accommodate use of dental holders where the template is not used or exact dimensions are not known, the Hough transform can be implemented along with apriori knowledge of the pre-scan image size. The scan area of interest can then be determined automatically and each dental radiograph as represented by the pre-scan can be bounded by a rectangle. Exposure levels during scan time are automatically adjusted to provide better image capture conditions on an image by image basis. The desired image area of the platen is scanned twice. A histogram analysis of a smoothed histogram of the initial prescan determines the exposure level to be adjusted for the final scan by analysis of the range of scanner code values found in the image.

A flat-bed scanner is first calibrated using a step-wedge of density steps. A look-up-table is constructed providing the relationship between scanner code values as outputted by the scanner and optical (or diffuse) densities contained in the step-wedge. This can be modeled explicitly where scanner code values are outputted in transmittance and no other non-linearities are introduced into the scanner. The relationship from optical densities to transmittance is well known and represented by the exponential function:

$$\text{Transmittance} = \alpha 10^{(-\beta\ Density)}$$

where $\alpha$ and $\beta$ can be determined from a least squares fit of the calibration data.

A look-up-table can be explicitly calculated from this so that in solving for Density the digitized image is represented in terms of optical densities. This calibration is executed and an associated look-up-table is computed for differing exposure levels or dwell time of the scanner. These transmittance/density LUTs will be used to accommodate under-, normal-, and over-exposed dental radiographs as the relationship between optical film densities and transmittance values is a function of exposure.

The second step consists of processing of the scanned image. A logarithmic transform is applied to the image using a generalized D-LogE curve for dental x-ray film in order to analyze the data. This allows for a histogram based method of determining the anatomical regions of interest (ROI) so that a tonescale look-up-table can be constructed. This tone scale look-up-table can be used for writing the digital image to laser film if so desired. Finally, a gamma look-up-table can be generated for viewing the tonescaled image in the soft copy venue on a video display. The option of viewing the image locally to accommodate viewing certain anatomical regions by applying an associated look-up table to enhance the local contrast more appropriately is provided.

The original digital dental x-ray image is further processed to determine original digital authentication data that is unique to the original digital dental x-ray image. This data is associated with the original digital image data. At the time of displaying an original dental x-ray image, a display digital authentication data for the image is determined. The display data is compared with the original data to authenticate that the original image has not been altered. Thus, insurance companies and colleagues are assured that the digital dental image is the original processed image. The insurance company benefits by not being overbilled for procedures that have not been performed.

ADVANTAGEOUS EFFECT OF THE INVENTION

The technique of the invention captures each image input to the system by regulating exposure during scanning and provides for an image dependent processing and verification method for digital radiographs. The invention disclosed here has the capability of automatically controlling and adjusting exposures during digitization on the platen of a flat-bed scanner. This is important where the optical densities found on the dental radiograph are close to the dynamic range of the scanner. Increased exposure can increase the signal-to-noise ratio where densities are high. The technique of the invention differentially accommodates image capture exposure requirements by reducing flare during the scanning process on a flat-bed scanner, automatically determining a single chosen image from the pre-scanned platen, and subsequently processing the image for rendering on a CRT. It also applies specific information about desired density values associated with various anatomical structures found in the dental radiograph and uses this during the image processing step.

BRIEF DESCRIPTION OF THE DRAWINGS

The preferred modes of the invention are described in detail with reference to the accompanying drawings, of which.

DETAILED DESCRIPTION OF THE INVENTION

Figures 1, 2:
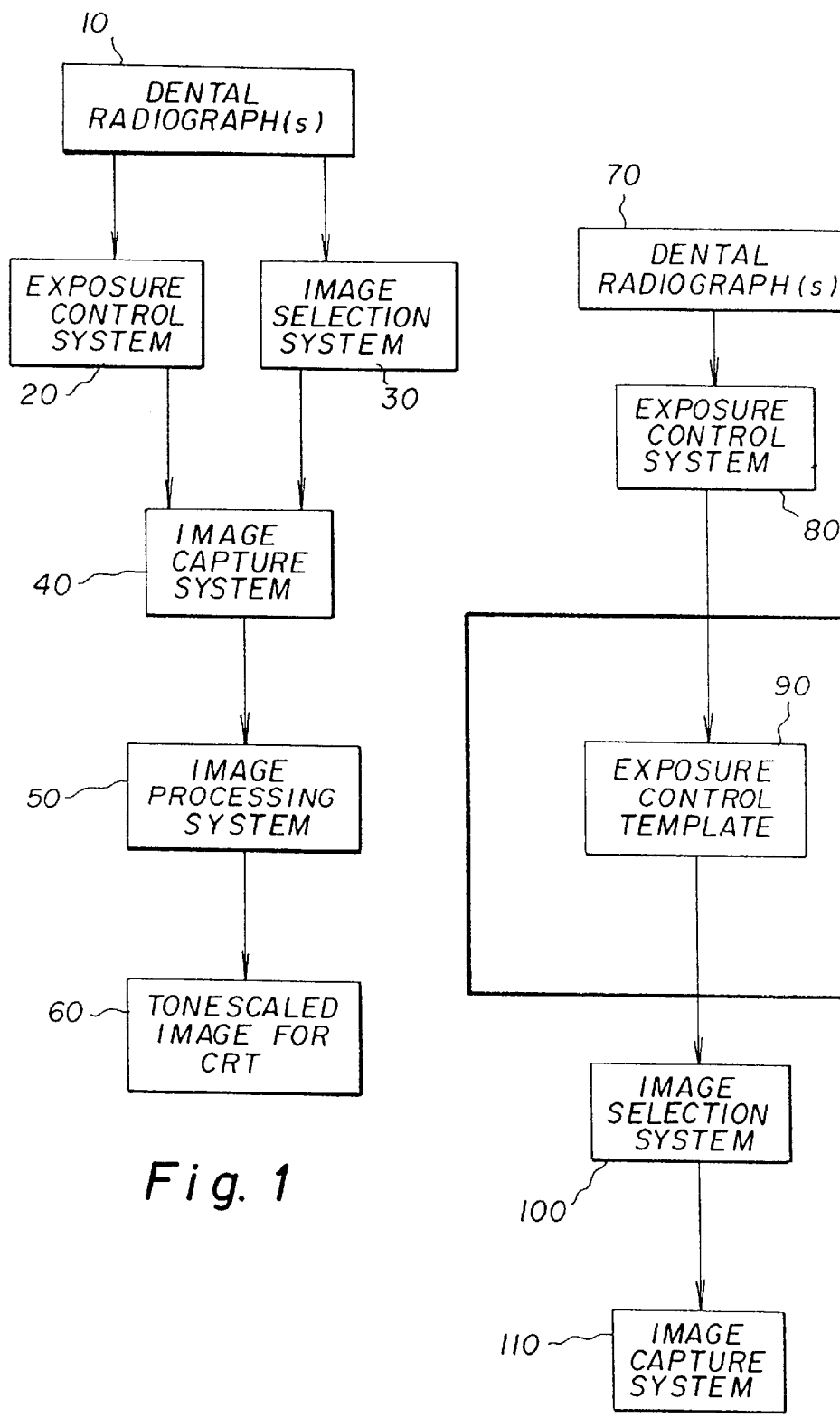
FIG. 1 is a simplified block diagram illustrating the overall system embodying the invention.
FIG. 2 illustrates the first stage resulting in input to the Image Capture System of the invention. This is an illustration of the Exposure Control System from Block 20 of FIG. 1.

The invention disclosed herein automatically digitizes small format films, such as dental radiograph(s) using a flat-bed scanner and processes the digital image(s) for rendering on a video display (such as a CRT) on an image-by-image basis. A high level illustration of the system realizing the invention is depicted in FIG. 1. The input to the system is a dental radiograph (or other small format film) (Block 10). The output or end result of the invention is a tonescaled version of the input image for display on a CRT (video display). (Block 60). This process is conceptualized as a two stage process. The first stage consists of the Exposure Control System (Block 20), Image Selection System (Block 30) and Image Capture System (Block 40). The Image Capture System generates an intermediate result consisting of a scanned image where a LUT has been downloaded to the scanner (Block 40). The second stage is that of Image dependent Processing (Block 50). Image dependent digitization and processing is computed using the following approach.

Figure 3:
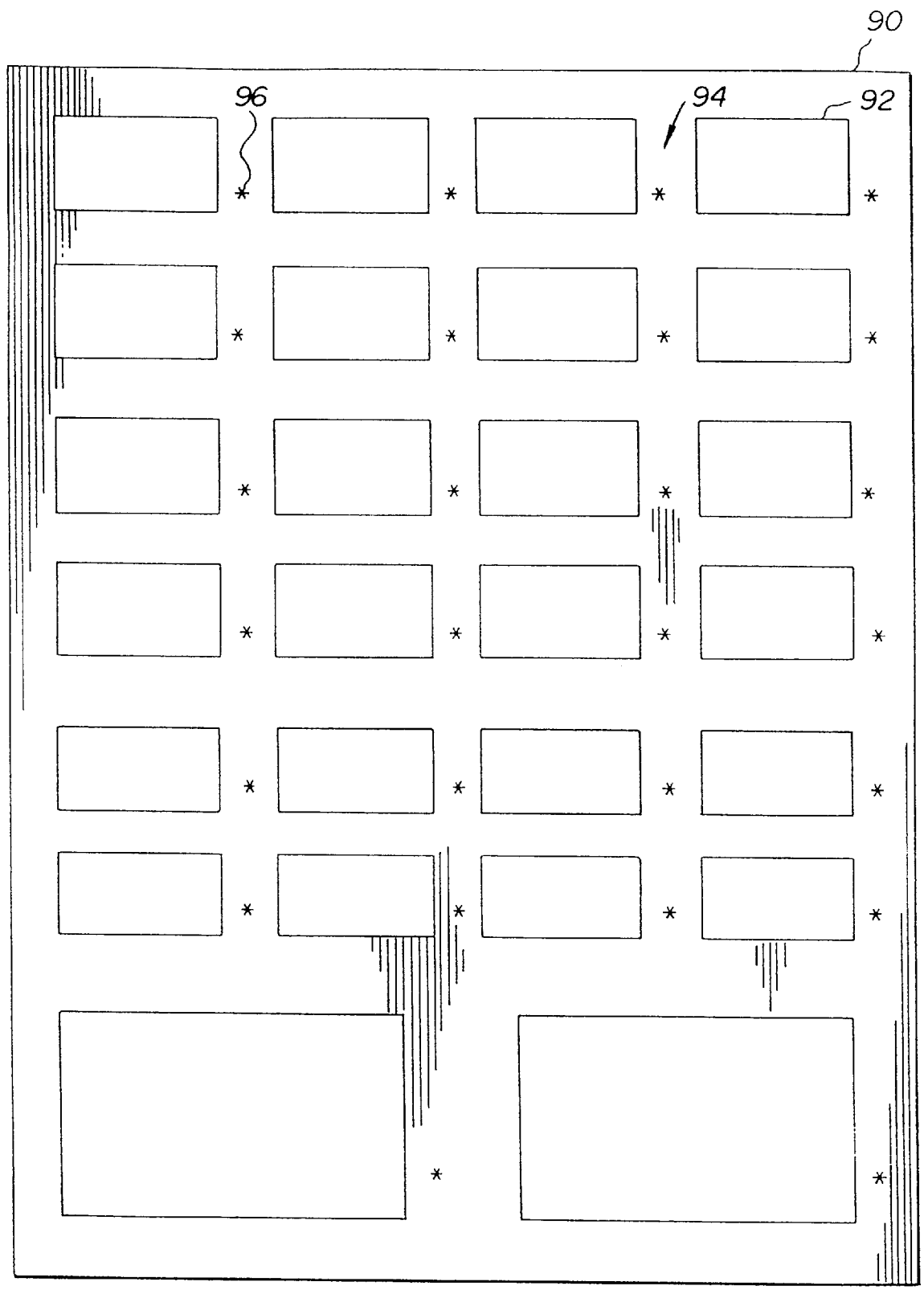
FIG. 3 represents a detailed illustration of the Exposure Control Template from Block 90 from FIG. 2.

The Exposure Control System referred to in FIG. 1 is depicted in FIGS. 2 and 3. The input x-ray image (Block 10 in FIG. 1, represents the same entity as Block 70 in FIG. 2), is the initial input to the system. This input image(s) is placed on the flat-bed scanner platen either inside the apertures of an Exposure Control Template (FIG. 3, Block 90 on FIG. 2) or in any form of dental radiographic holder containing dental radiographs. Template 90 includes apertures 92 dimensioned to hold dental radiographs of standard sizes including 0, 1, 2, 3, and 4. The regions 94 around apertures 92 are opaque to minimize unwanted flare during scanning. The material of template 90 should ideally be black with a matte finish. Located next to each aperture 92 is an indicator 96 to facilitate placement of the dimple marker of dental film in order to properly orient the film in the template. Other indicia may be included to assist in properly orienting the film.

The intent of using template 90 (or holder) is to reduce unwanted flare during the process of image capture due to the configuration of a flat-bed scanner with a transparency adapter. A second purpose for use of the template is to assist in proper vertical and horizontal alignment of the dental radiograph(s) to the sensor array of the scanner. The Exposure Control Template 90 indicates how the radiograph(s) should be placed to eliminate the need to flip or rotate the digitized image. The entire platen is first pre-scanned at a low resolution and is presented on a video display to a user for image(s) selection (Block 100). Subsequent high resolution scanning and processing follow.

Figure 8:
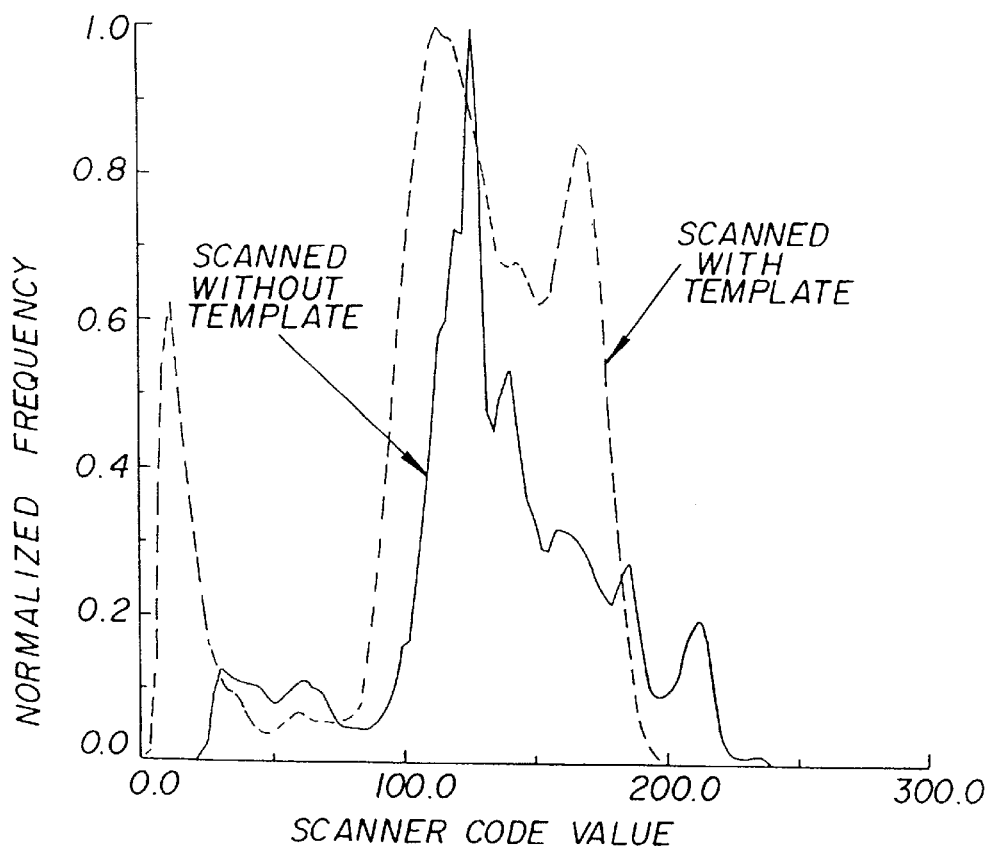
FIG. 8 depicts the respective histograms of a single dental radiograph that was digitized in two differing manners; once with use of the Exposure Control Template and secondly without the use of the Exposure Control Template.

FIG. 8 shows how extraneous flare has altered the image capture by illustrating the histograms of the same dental radiograph with and without use of the Exposure Control Template.

Figure 4:
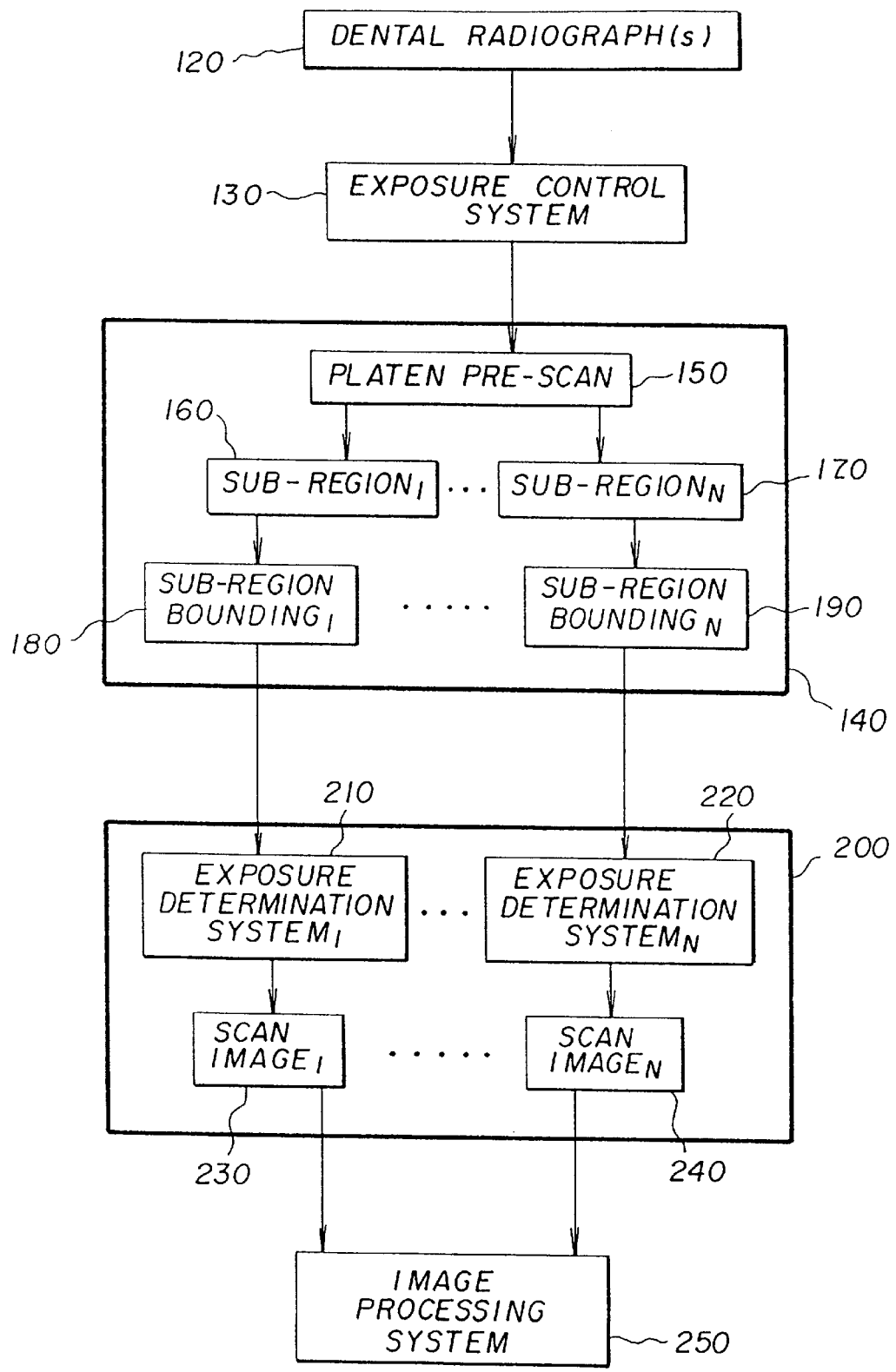
FIG. 4 is a simplified block diagram representing a detailed illustration of the Image Selection System where dental radiographs are grouped in dental holders and placed on the platen for digitization as an alternative to the Exposure Control Template (Block 30 from FIG. 1).

The Image Selection System (Block 100, FIG. 1 and Block 140, FIG. 4) is illustrated in FIG. 4. Where the Exposure Control Template (90, FIG. 3) is used, the exact locations of all configured rectangles (92, FIG. 3) to hold any radiograph may be known. In this case, a user-selection point in the interior of a selected radiograph as represented by the pre-scanned platen image is used to locate the closest bounding rectangle of said image. This region of the platen will subsequently be digitized. Where the Exposure Control Template (90) is not used or exact locations of the apertures are not known, radiographs are placed in a dental holder(s) at the template and then are pre-scanned. The Sub-region Bounding System (Blocks 160-190) determines a bounding rectangle from a user-selected point in the interior of a selected image on the pre-scanned platen. A sub-region of the displayed pre-scanned platen containing the desired image is selected and processed further. A thresholded gradient image is generated so that the Hough Transform is used to generate an array containing the locations of any vertical and horizontal lines found in this sub-region (Blocks 160, 170). Many methods for doing this are found in Ballard, D. H. and Brown, C. M., Computer Vision, Prentice Hall, 1982, pp. 76–78; and Abdou, I. D., "Quantitative Methods of Edge Detection," USCIPI Report 830, Image Processing Institute, University Southern California, July 1978. This subregion is searched to test horizontal and vertical locations found in the Hough array using edge information and statistics of an area in proximity of the line element. The standard deviations and thresholded counts of edge pixels found in the edge image are computed. The closest line element in the Hough array meeting the criteria of a thresholded standard deviation and number of edge pixels is selected as a bounding line in each horizontal and vertical direction.

Figure 5:
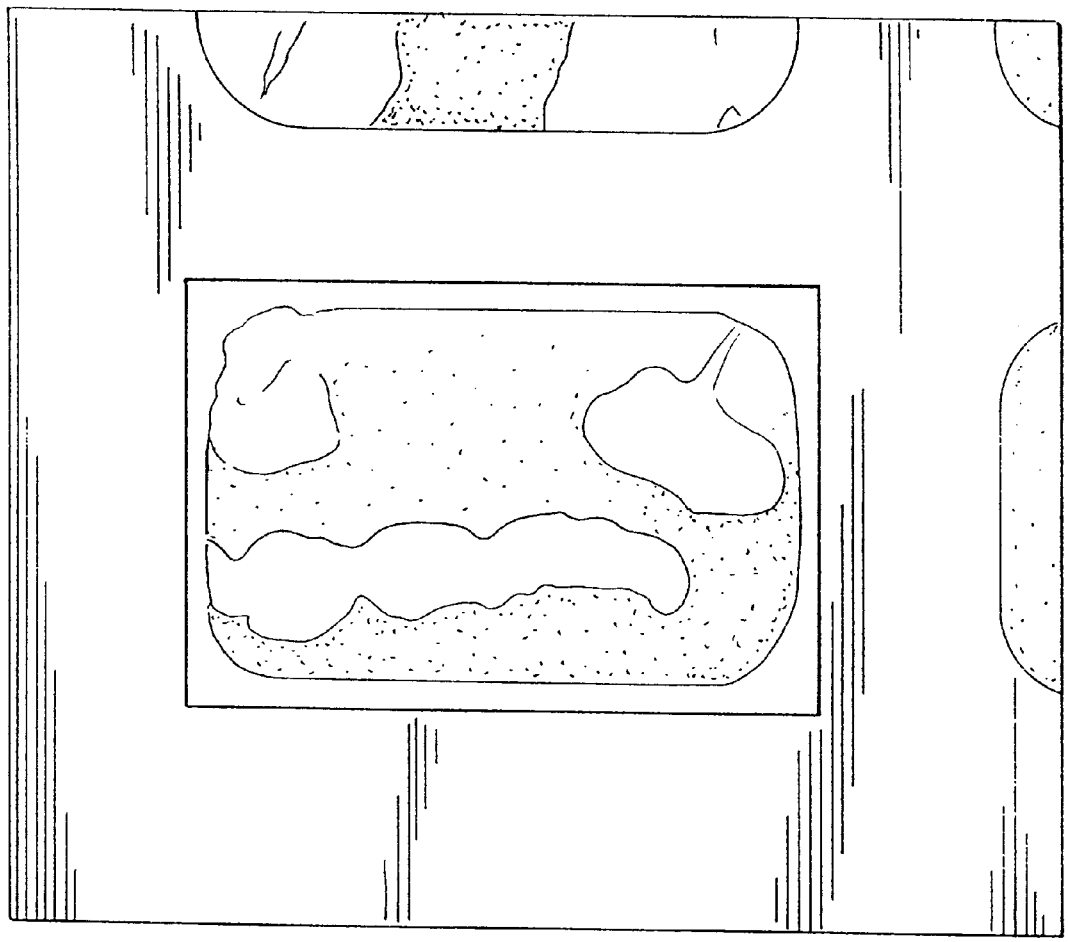
FIG. 5 is a representation of the output from the Image Selection System where a user defined point is used to determine a bounding rectangle so that only the defined sub-region of the platen is digitized. This illustrates output from Block 30 from FIG. 1.

FIG. 5 shows the output of this Line Detection System for a selected radiograph contained in a dental holder. This rectangle defines the area of the pre-scanned platen to be digitized at a desired resolution.

Figure 7A:
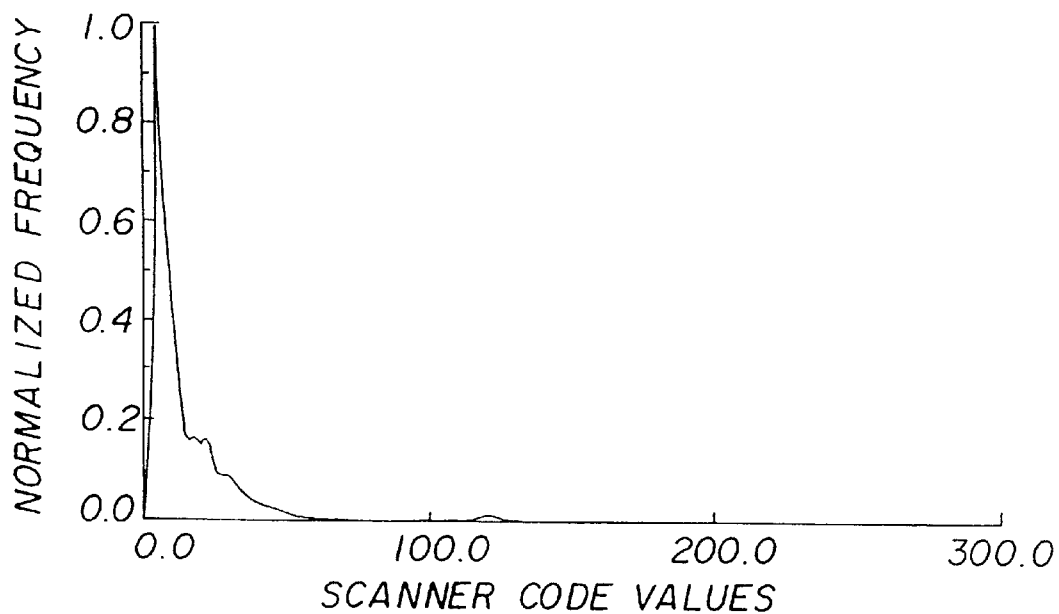
FIGS. 7A–7C illustrate scanner code value histograms associated with three different dental radiographs where three exposure classes are considered; respectively, under-, normal-, and over-exposed images.
Figure 7B:
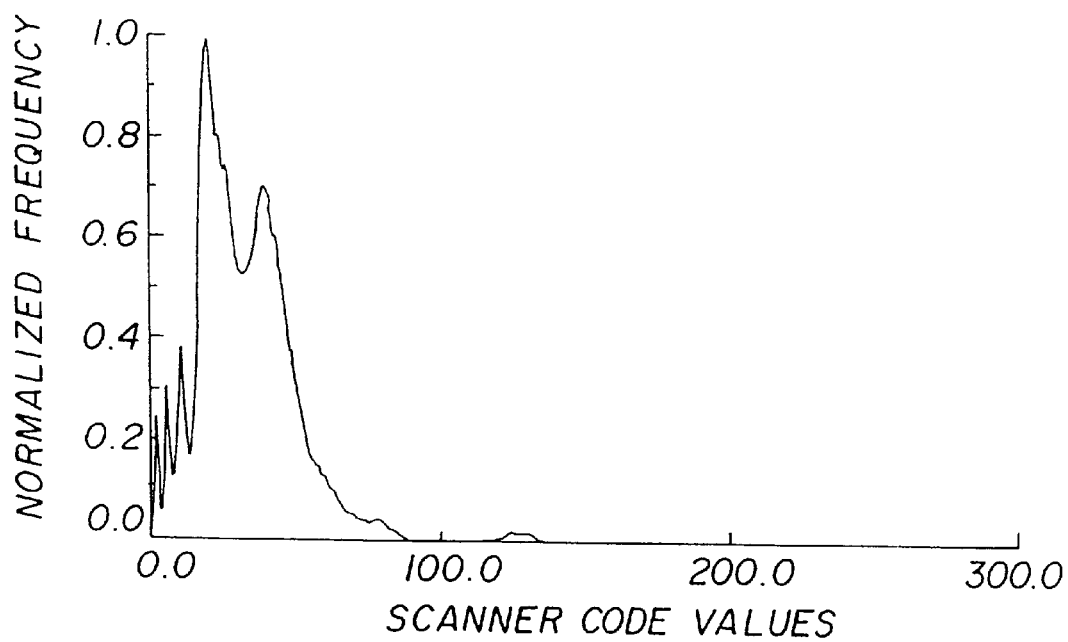
Figure 7C:
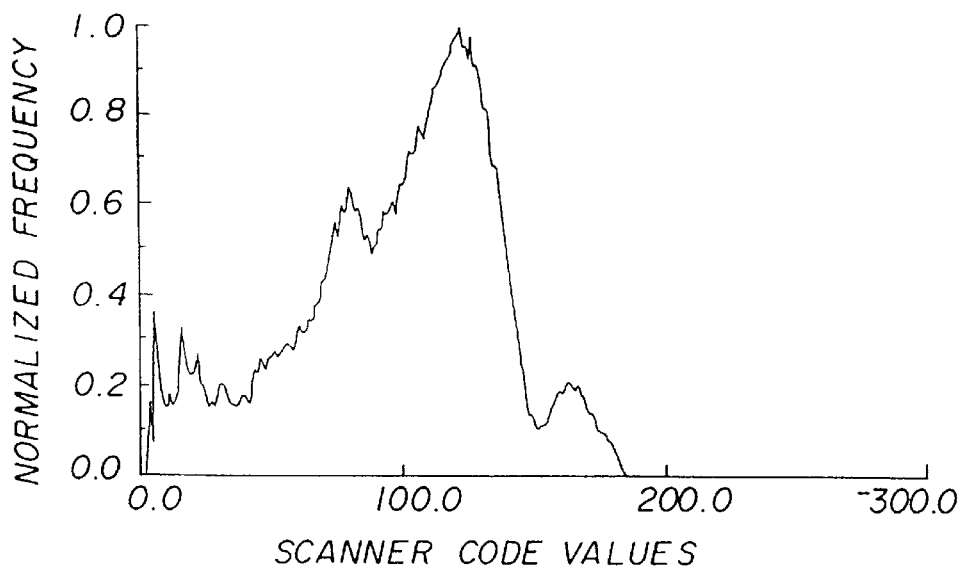

The Image Capture System (Block 200) independently adjusts exposure levels on an image-by-image basis (Blocks 210, 220) so that the resulting exposure adjustment is used to digitize the said image (Blocks 230, 240). This results in a lower exposure level (typically realized in terms of dwell time), for an under-exposed radiograph and a higher exposure level to digitize an over-exposed radiograph to increase the signal-to-noise ratio for said image. This is realized after the initial pre-scan of the selected image prior to the second, final scan. A histogram analysis of a smoothed histogram is performed on the first scan of the image(s) to determine the range of scanner code values that are significantly associated with structures other than background or amalgam found in the dental radiograph(s). FIGS. 7A–7C depict the histograms, respectively, of an under-, normal-, and over-exposed dental radiograph. We consider the first derivative in searching for the region of the histogram where there is insignificant change in order to avoid the scanner code values associated with amalgam. The resulting analysis provides a maximum scanner code value that is associated with anatomical regions and is used to determine whether the dental radiograph(s) is under-, normal-, or over-exposed. Exposure level or dwell time is adjusted accordingly. Each determined exposure level or dwell time has an associated LUT that has been computed by previous calibration of the scanner using the exponential function:

$$\text{Transmittance}=\alpha 10^{(-\beta\ Density)}$$

where $\alpha$ and $\beta$ can be determined from a least squares fit of the calibration data. This equation is used to give the relationship between scanner code values and optical densities. These LUTs can be downloaded during scan time to maximize bit selection. The radiograph is then digitized and becomes input to the Image Processing System (Block 250, FIG. 4).

Figure 6:
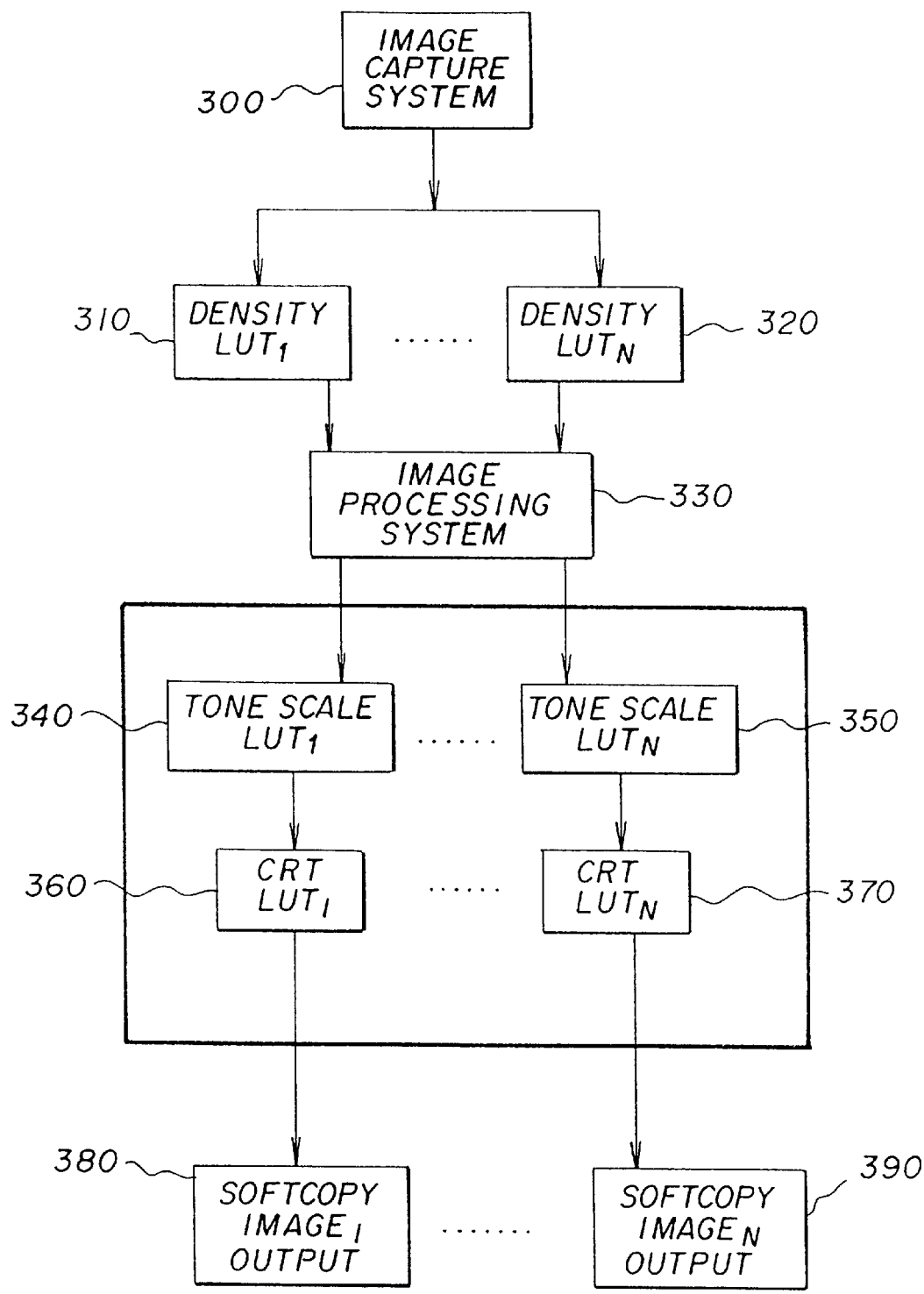
FIG. 6 is a block diagram illustrating the overall steps in the Image Processing System (Block 50 from FIG. 1).

The second stage of the invention is termed an Image Processing System (Block 330, FIG. 6). Where the Density LUT(s) (Block 310, 320) are not downloaded to the scanner, these LUT(s) can be applied in the image processing step prior to the application of the Tone Scale LUT(s). The Tone Scale LUT(s) (Blocks 340,350) is computed by analyzing the histogram of the logarithm of the digital values representing densities. This logarithmic function was established by considering a generalized dental x-ray film characteristic curve and is used for the purpose of compressing the data further in order to aid in histogram analysis of a smoothed histogram for finding the regions of anatomical interest (ROI) in the image.

Figure 11A:
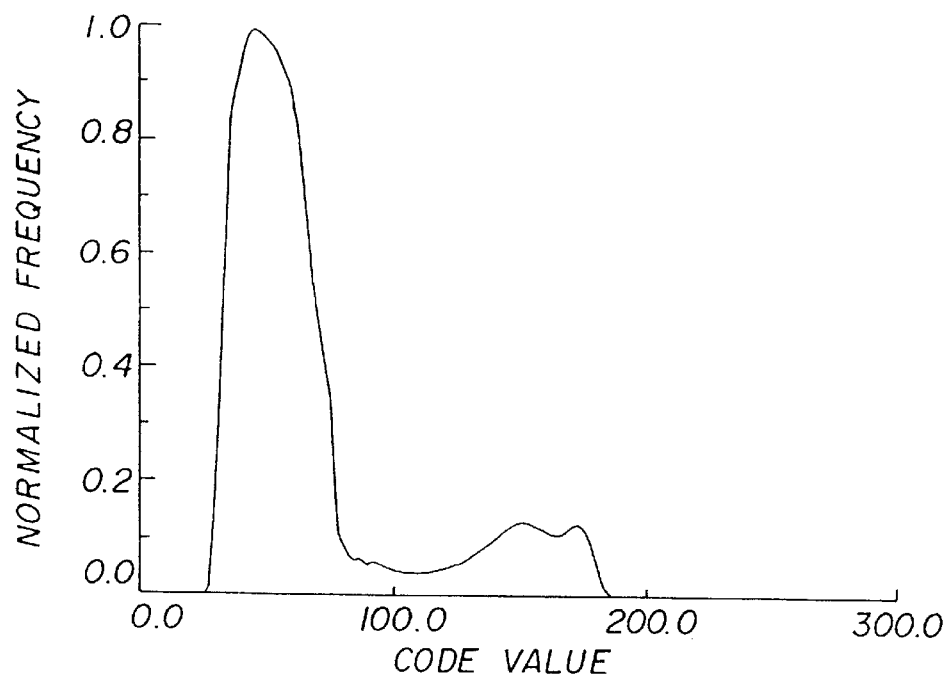
FIGS. 11A and 11B depict histograms of a digitized dental radiograph; a histogram of the digital image representing value in optical densities and second, a histogram of the digital image representing values where a logarithmic function has been applied to density values, respectively.
Figure 11B:
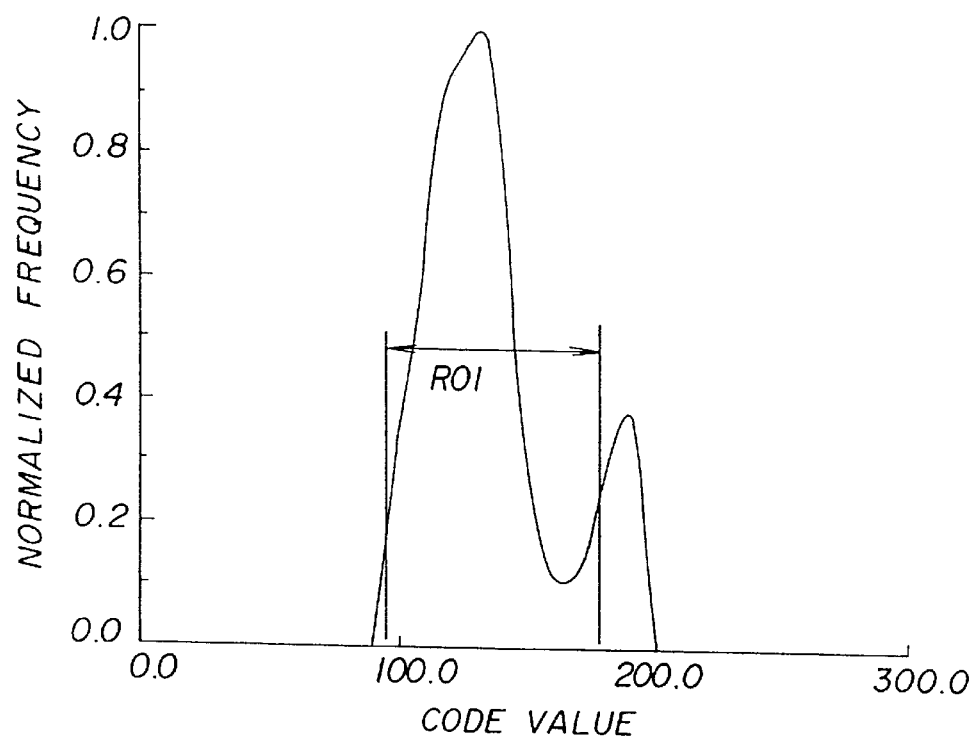

FIGS. 11A and 11B illustrate image histograms representing both densities and the logarithm of these densities. The shape of these histograms can be uni-, bi-, or tri-modal and depends upon image content. The presence of background and large amounts of amalgam (e.g. bridge work, caps) will yield the tri-modal histogram. The first and second derivatives are used in the analysis to search for both peaks and valleys as well as any points of concavity. Endpoints of a region of interest (ROI) is determined to be a percentage of the distance between a peak and a valley where the peak falls below a threshold of the normalized histogram. Where there may be a significant point of concavity, the endpoint is chosen by adding a small percentage of the distance between the point of concavity and the maximum subtracting and/or adding minimum code value in the log image. Where the histogram is uni-modal, the ROI is determined by the range of code values. A small percentage, r, of this range added to the first code value of the image yields the first code value of the ROI. Similarly, $\rho$ subtracted from the last code value yields the endpoint of the ROI.

The first code value of the ROI is determined to represent an anatomical structure of a low density value, such as the enamel area in a bite-wing radiograph. The last value of the ROI is determined to be near the threshold between the periodontal bone levels and the background of the radiograph. A tonescale curve is constructed (FIG. 6, Blocks 330, 340). A piecewise non-linear curve is constructed so that a linear portion extends from the two points determined as the start point and end point of the ROI and such that the first point is mapped to a desired density for enamel areas found in dental images, and the end point of the ROI is mapped to a desired density for the interproximal areas near the background. Two non-linear segments are piece-wise constructed representing the "toe" and "shoulder" of the tonescale curve.

FIG. 6 (Blocks 360, 370) illustrate the CRT LUT(s), which are necessary for display on a CRT display. If the dental images are not displayed, the CRT LUTs are not used. The images processed by LUT(s) 340, 350 can be written to film using a laser film writer. The inputs are the image(s) outputted from Blocks 340, 350. A look-up-table is generated relating to the gamma, $\gamma$, of the CRT or other electronic display device. Each monitor can be calibrated to determine the precise gamma, thereby taking into account the luminance range found on the CRT. Where precise measurements on a light meter have not been taken a general gamma is determined (e.g., $\gamma=1.8$). A general CRT LUT(s) as found in the literature is determined by:

$$T=(V)^\gamma, \text{ where } V=(\text{code value/maximum gray level}).$$

The Input Image (Block 20, FIG. 4) is processed to produce the final product output by the invention: a Tonescale Image (FIG. 6, Blocks 380, 390, represents the same entity as FIG. 1, Block 60).

Figure 9A:
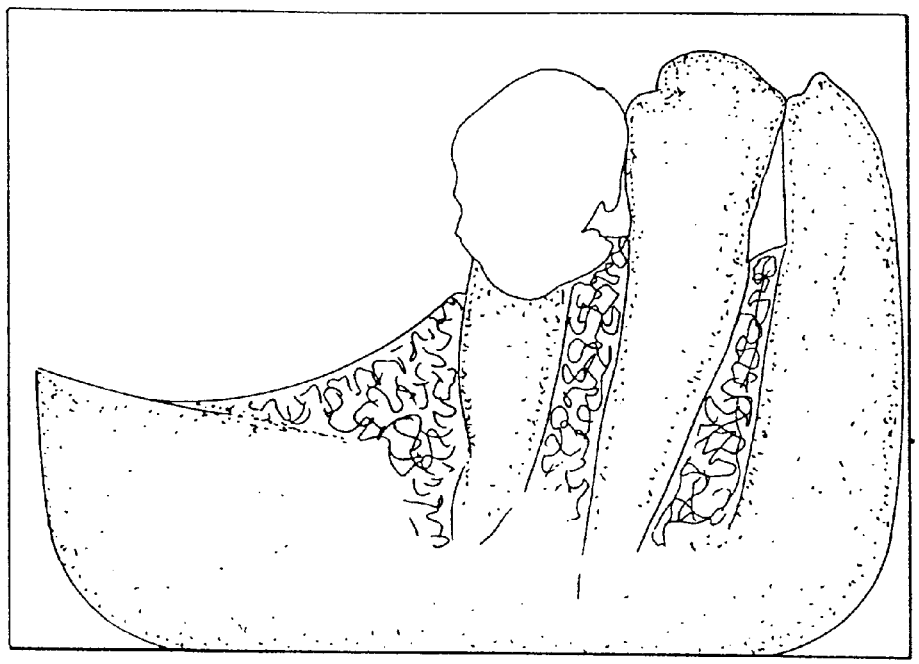
FIGS. 9A and 9B illustrate two examples of a digitized dental radiograph; one processed by use of invention and the second digitized using only default settings on the scanner, respectively.
Figure 9B:
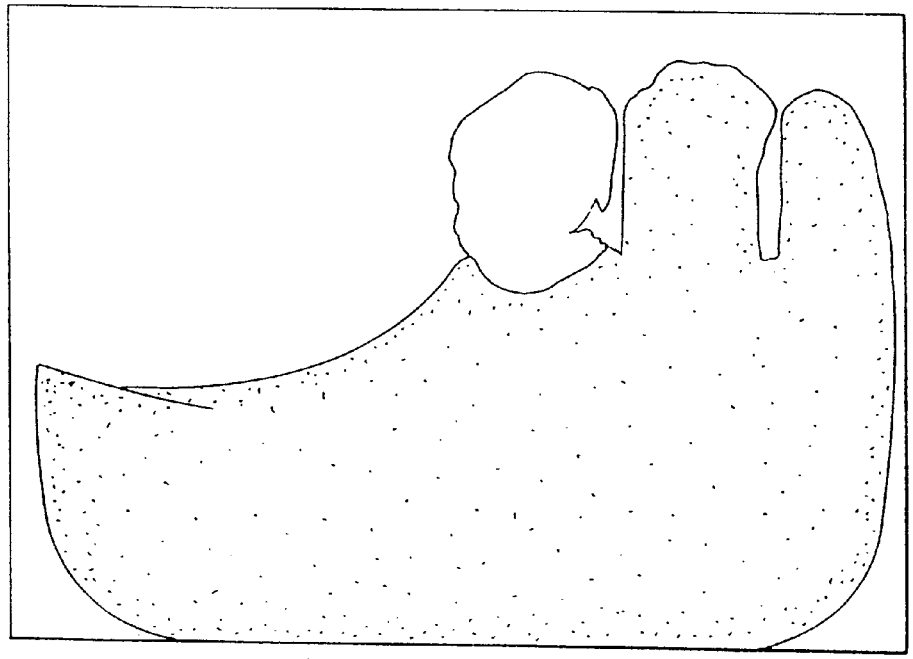

FIGS. 9A and 9B illustrate a processed radiographic Image as outputted by the invention compared to the same radiograph digitized where no default settings have been altered.

Figure 10A:
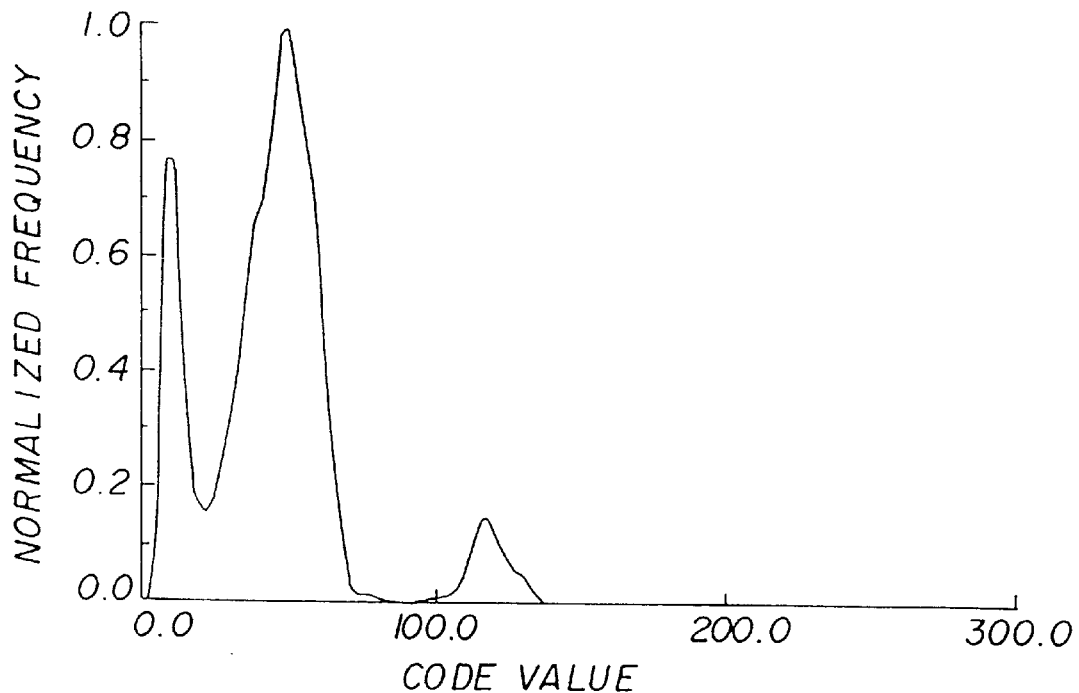
FIGS. 10A and 10B depict the respective histograms of the digitized images found in FIGS. 9A and 9B, respectively.
Figure 10B:
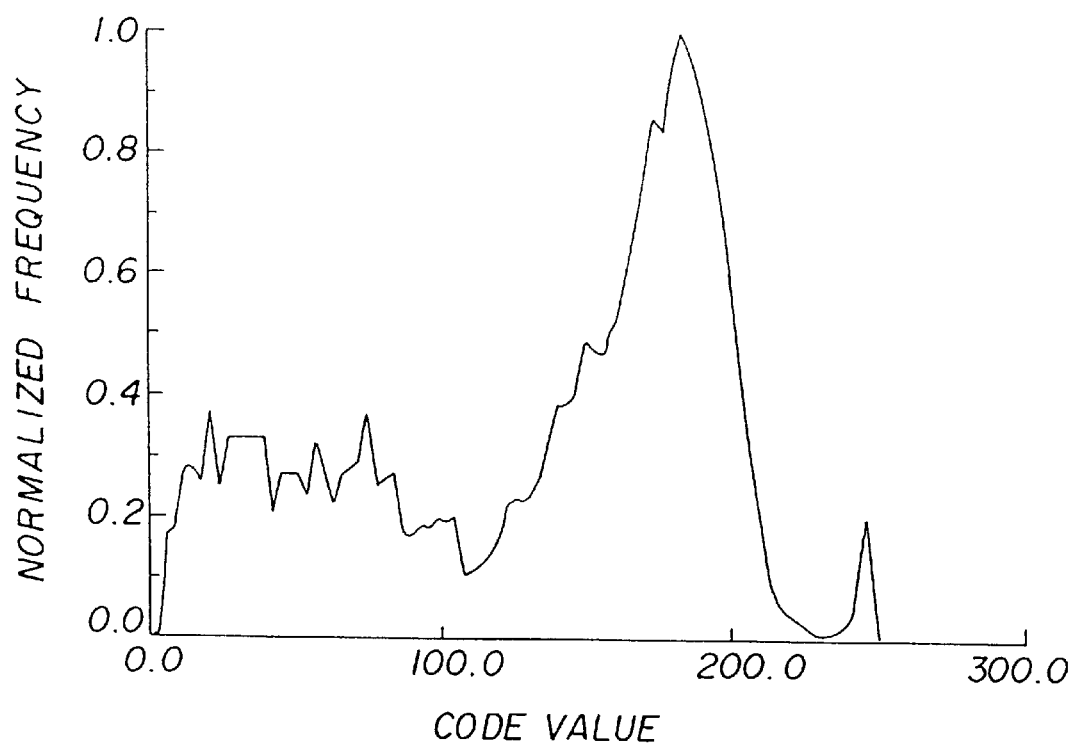

FIGS. 10A and 10B illustrate the histograms of these digital images respectively.

Figure 12:
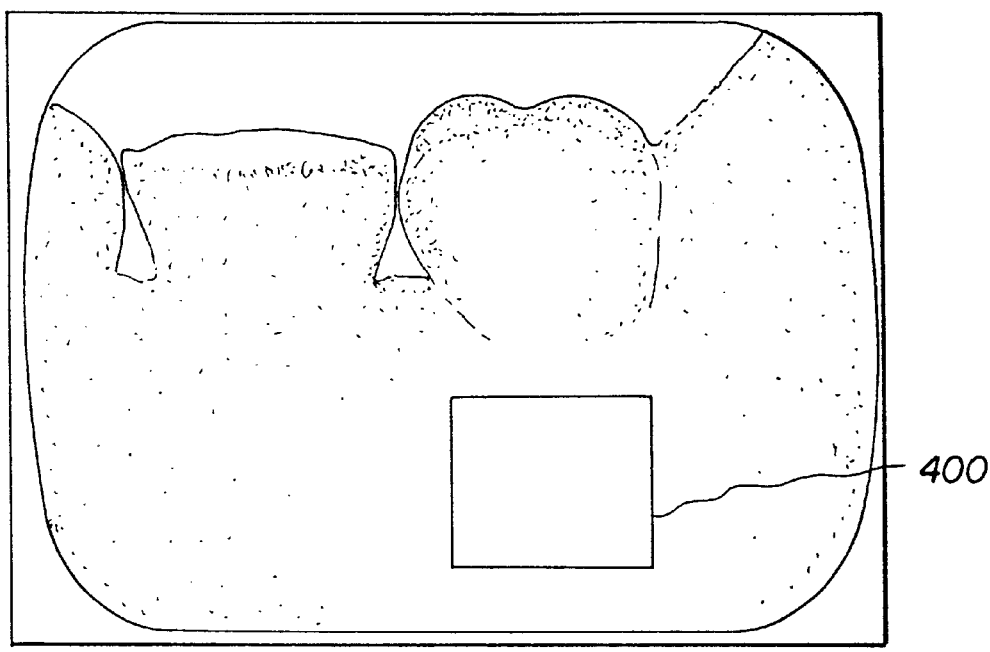
FIG. 12 is an example of a dental radiograph showing a selected region for pathology dependent viewing.
Figure 13:
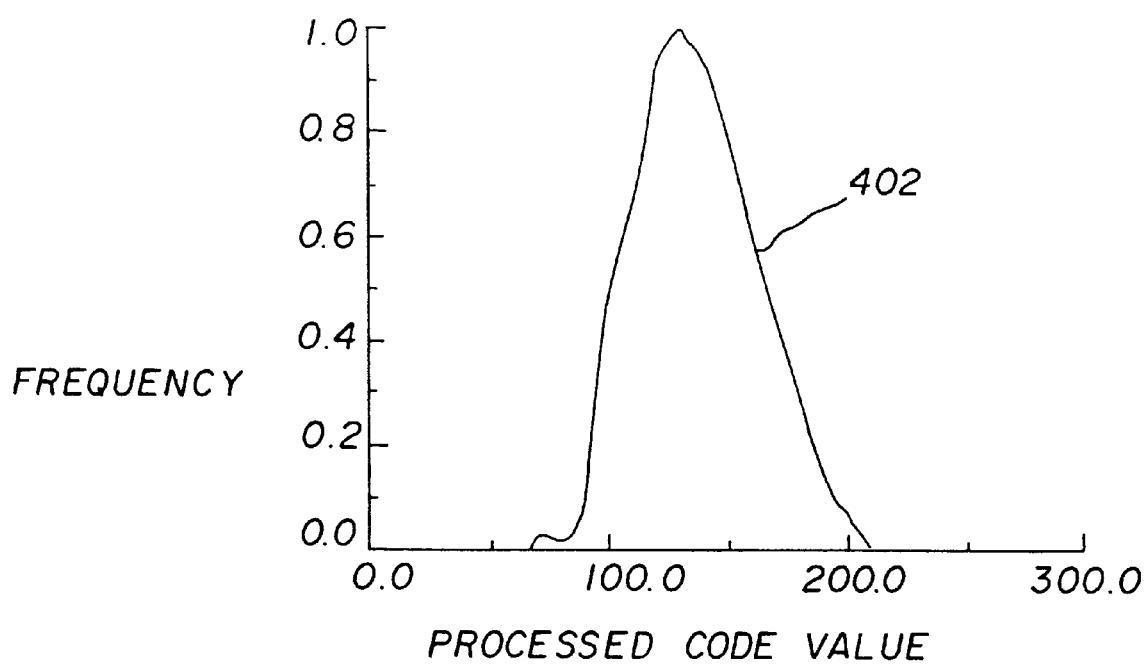
FIG. 13 is a histogram of the processed pixels in the selected region shown in FIG. 12.
Figure 15:
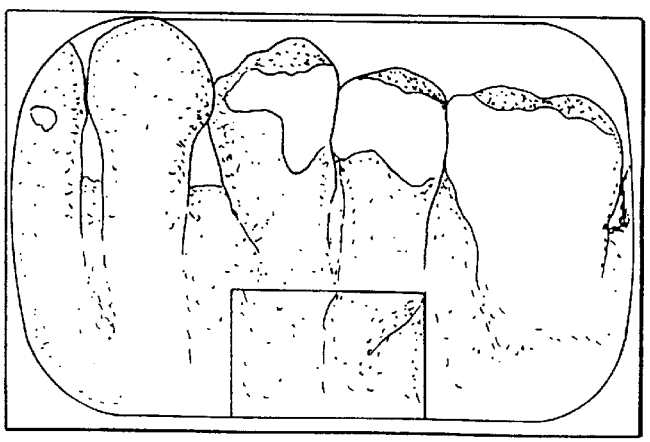
FIG. 15 is an example of a dental radiograph showing a pathology dependent view.

The method of the present invention can be applied a second time to a user selected subregion of the processed image to further adjust the contrast in the selected region to accommodate pathology dependent viewing of the image. Referring to FIG. 12, a region 400 is selected, for example, by using a standard drawing tool, such as a rectangle or ellipse tool. The previously processed pixel values in the selected region are then further processed, as follows, to alter the contrast in that user-selected subregion. Referring to FIG. 13, a histogram 402 is formed of the processed pixels in the selected region. The pixels within the range of the histogram are remapped using a mapping function 404 to produce output code values covering the dynamic range of the CRT (0–255). The mapping function is implemented as a look-up-table in the image processing system. Any one of several user preferred mapping functions can be applied to specific anatomical areas to provide an appropriate contrast to these local areas. The processed pixels in the selected region are replaced by the remapped pixels and the resulting image is displayed. An example of the resulting pathology dependent view is shown in FIG. 15.

Figure 14A:
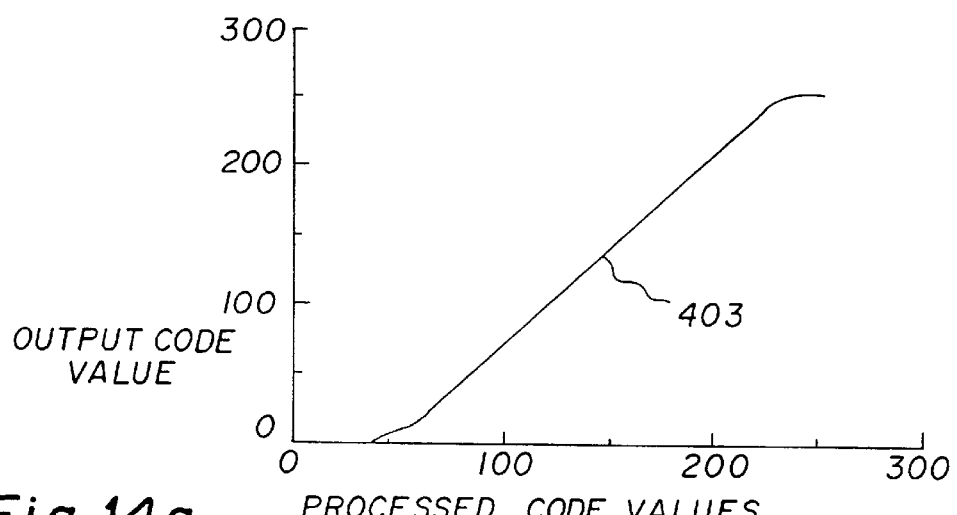
FIG. 14 is a graph showing a contrast function that is applied to both the image being displayed on the CRT (Block 403) and the pixels in the selected region (Block 404).
Figure 14B:
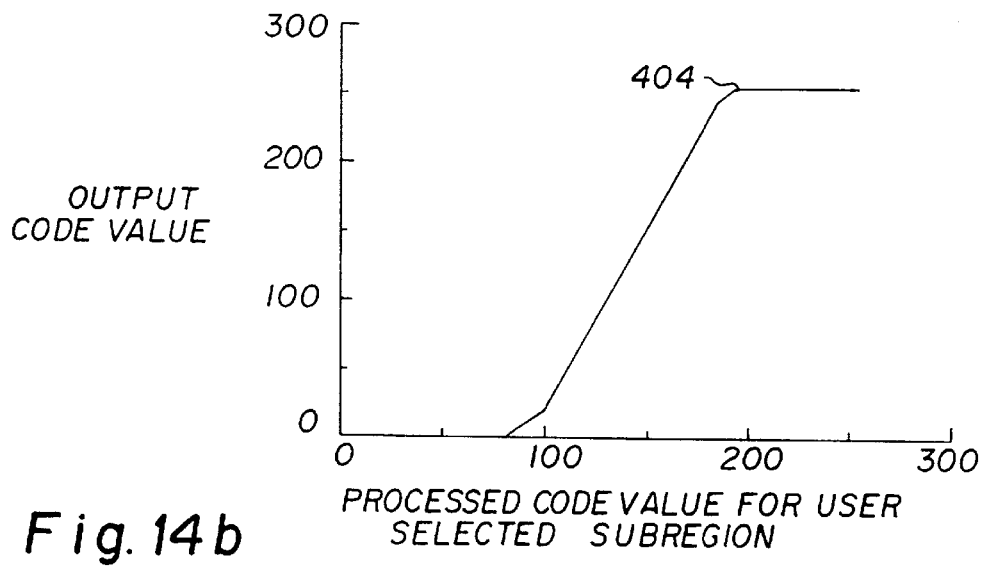
Figure 16:
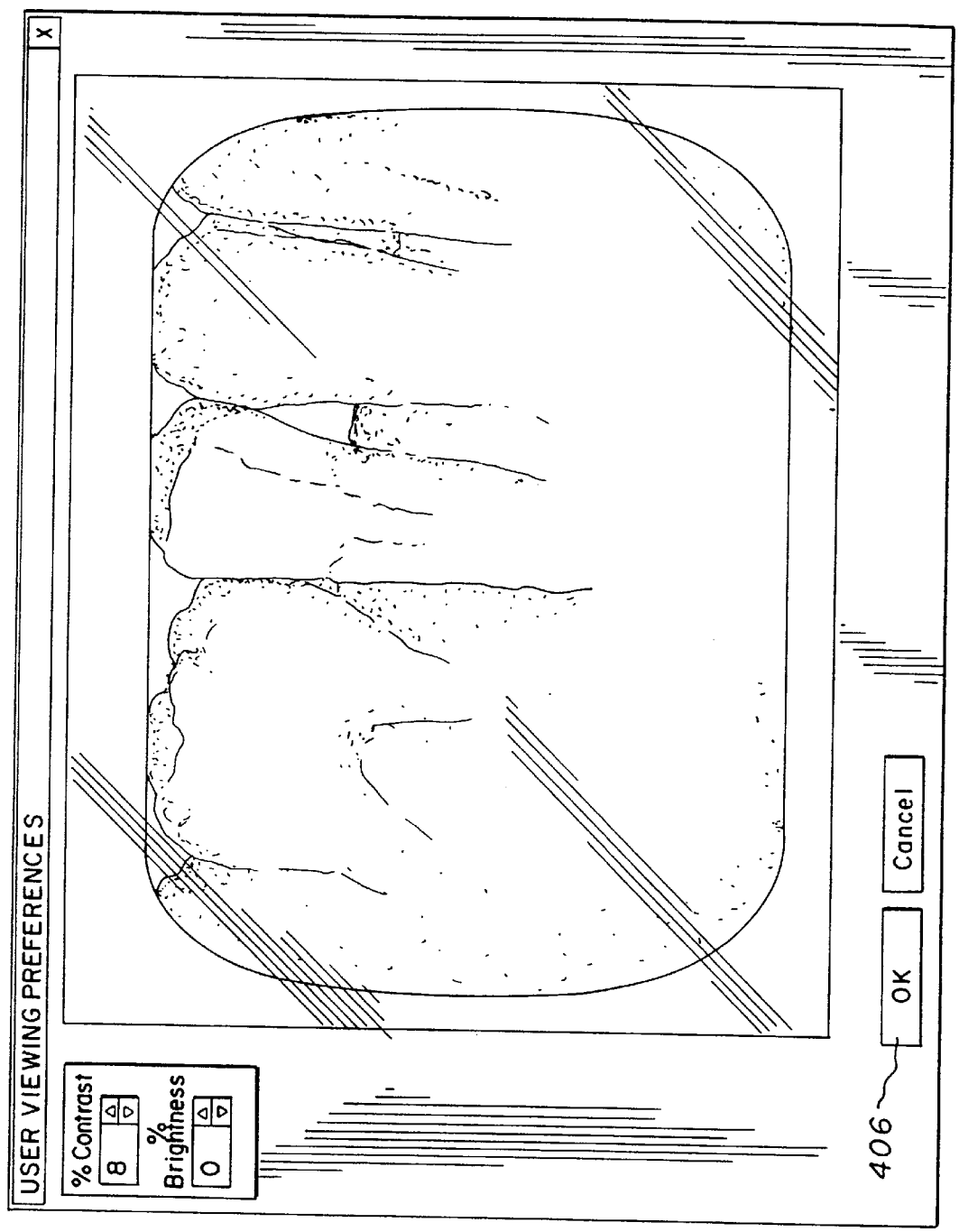
FIG. 16 is a screen view showing a user preference dialog box for setting contrast and brightness for all processed images.

Conventional control software for CRT displays include contrast and brightness adjustments. A user may prefer a particular contrast and brightness setting to view the images processed as described above. As shown in FIG. 16, a contrast and brightness preference dialog box 406 is provided to the user. When the user selects a preferred contrast 408 and brightness 410, a software script is generated for automatically applying the selected contrast and brightness to an image. This script is associated with images that are processed in the processing system. The preferred contrast and brightness setting is then automatically applied to all images processed by the system before they are displayed. Selecting a particular brightness value has the effect of adding (or subtracting) a constant code value to all of the pixels in the processed image. When a particular contrast is selected, all of the pixels of the image are processed through a contrast transform function, similar to that shown in FIG. 14 (Block 404).

To assure that the processed digital dental image has not been altered, a digital authentication data is determined for the original dental radiograph. This data is associated with the original digital dental image. At the time of soft copy display, digital authentication data is determined for the digital dental image to be displayed. The display authentication data is compared with the original authentication data to authenticate that the original digital dental image has not been altered. If it has the image is labeled as not for diagnostic viewing. If it has not been altered, it is displayed and labeled for diagnostic purposes.

Figure 18:
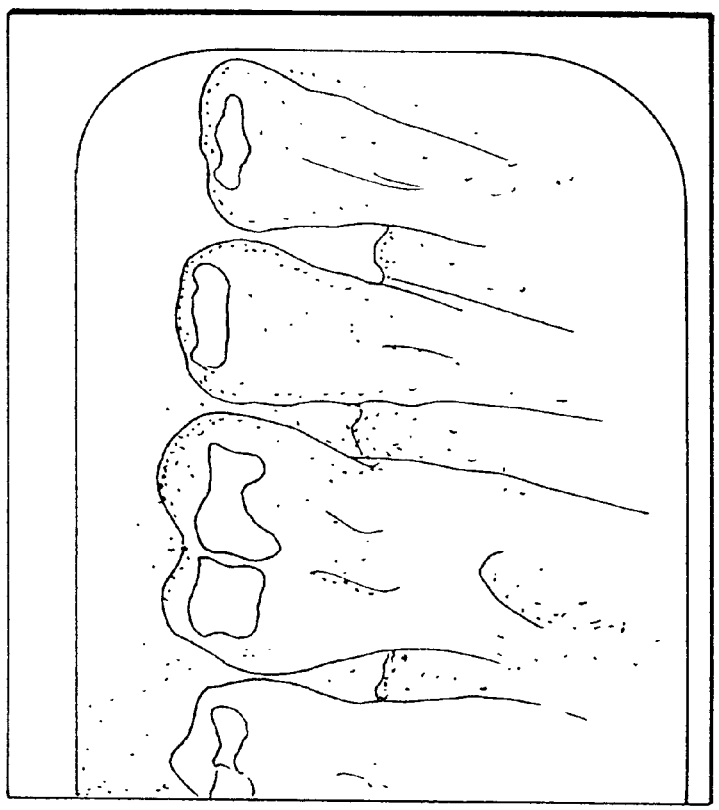
FIGS. 17 and 18 are dental radiographs illustrating another feature of the invention.
Figure 17:
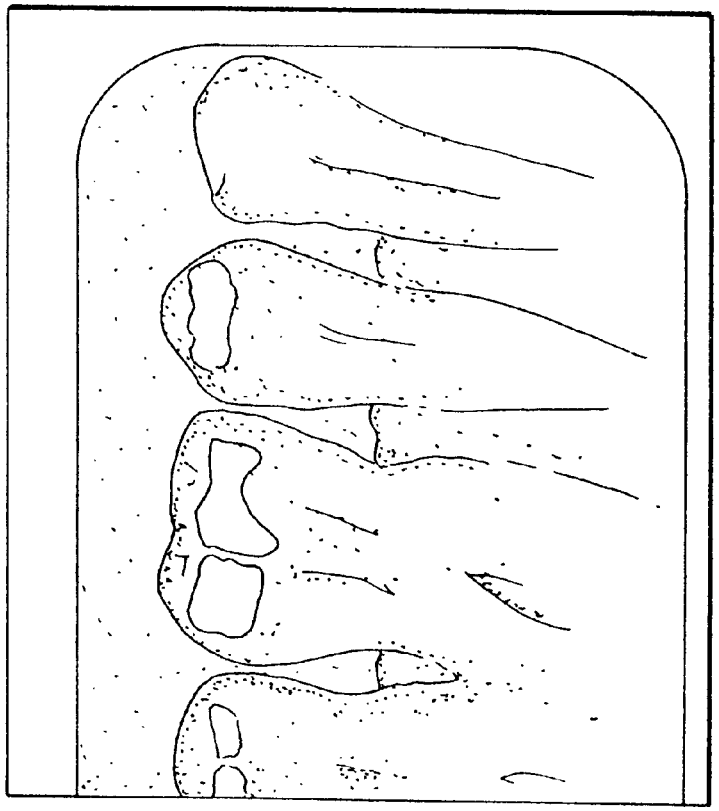

FIG. 17 shows an unaltered original image while FIG. 18 shows an altered image which includes an added dental filling on the right hand tooth. The altered dental image would result in a higher dental fee being paid by the insurer.

The digital authentication data can take many forms. A simple form is a simple determination of the check sum for the entire image. As an example, a digital dental x-ray image can be a 300×200 pixel array with each pixel represented by an 8-bit code value of 0–255. The check sum would be determined by adding the pixel code values for all 300–200 pixels. The determination is simplified since the data from the histogram of the digital dental image can be used. Other forms can include using only the region of interest of the digital dental image (such as the upper tooth region, which would include dental fillings), using various algorithms or the like.

Although the invention has been described above with respect to dental radiographs, it will be understood that other types of radiographs or small format films can be used in the scanning phase of the invention. It will also be understood that the image processing aspects of the invention can be applied to any kind of digital images, irrespective of source.

The invention has been described in detail with particular reference to certain preferred embodiments thereof, but it will be understood that variations and modifications can be effected within the spirit and scope of the invention.

What is claimed is:

1. A method of image dependent digitizing of small format films, processing the resultant digital images, and rendering said digital images for output presentation, comprising the steps of:

in a pre-scan of a flat bed digitizing scanner having a platen, digitizing small format films placed on said platen, using an opaque exposure template having apertures in which the films are placed, or other means to surround the films with appropriate material to reduce flare;

displaying the pre-scanned images on a display and using an image selection system to generate a bounding rectangle on the display to select pre-scanned images to be further processed and digitized;

automatically determining exposure adjustments by histogram analysis of a smoothed histogram of each said selected pre-scanned images for digitizing said selected pre-scanned images in another scan;

processing each of said selected digitized images to generate an enhanced image for presentation by an output device;

calculating original digital authentication data from said digital images that is unique to the original small format films and associating such data with the digital images;

at the time of displaying an original small format digitized film, determining digital authentication data for said film; and comparing the digital authentication data of a film to be displayed with the original digital authentication data associated with the digital image to authenticate the original image.

2. The method of claim 1 wherein said processing step includes the steps of processing each said selected image with a tone scale look up table based on a region of interest of said image.

3. The method of claim 1 wherein said output device produces a copy of said selected images on output media.

4. The method of claim 1 wherein said output device is an electronic display.

5. The method of claim 2 wherein said output device is an electronic display and wherein said processing step further includes the step of processing each said selected image with a gamma look up table for said electronic display.

6. The method of claim 1 wherein said determining steps include determining a check sum of each digital image and comparing the check sums for authentication.

* * * * *